May 8, 1951  H. N. HARRIS  2,551,671
OVER-CENTER MECHANISM
Filed March 11, 1946  3 Sheets-Sheet 1

INVENTOR:
HARLAN N. HARRIS,
BY Robert M. McManigal
ATTORNEY.

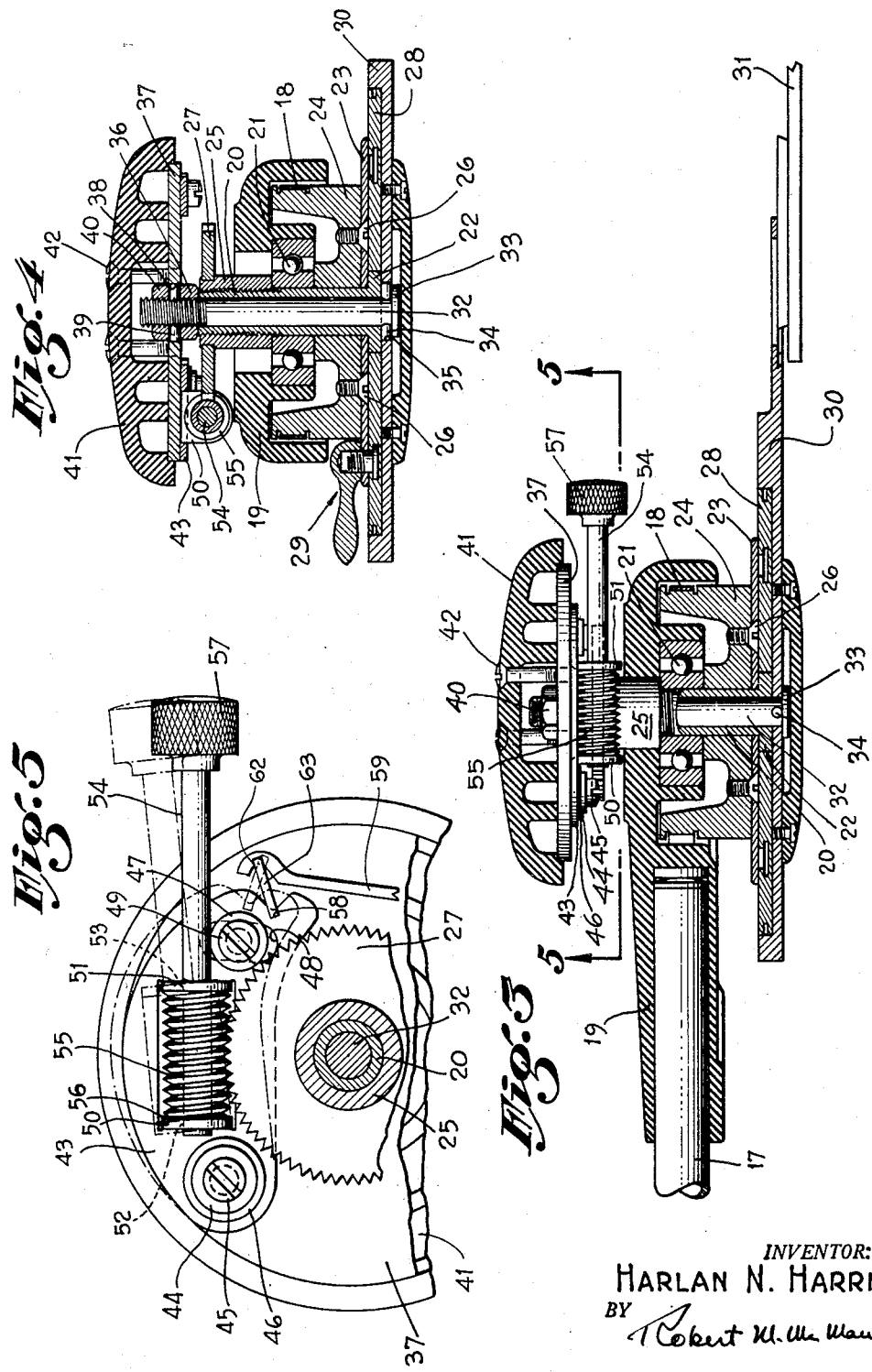

May 8, 1951 H. N. HARRIS 2,551,671
OVER-CENTER MECHANISM
Filed March 11, 1946 3 Sheets-Sheet 3
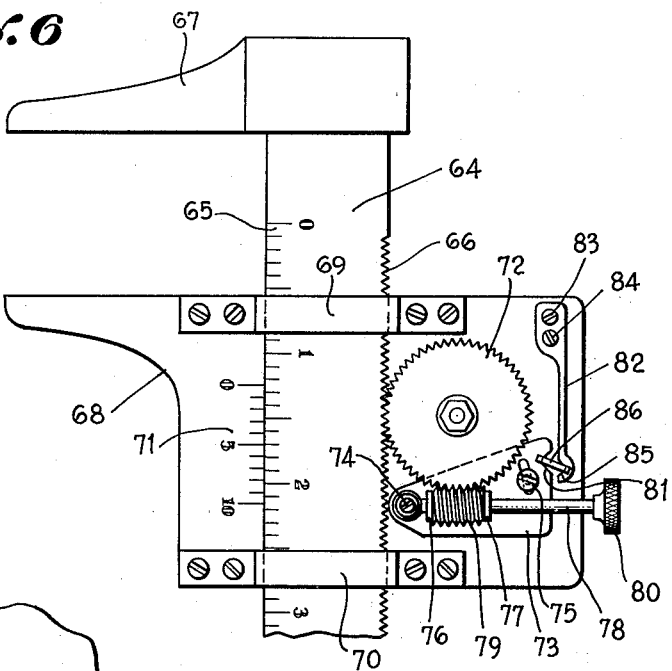
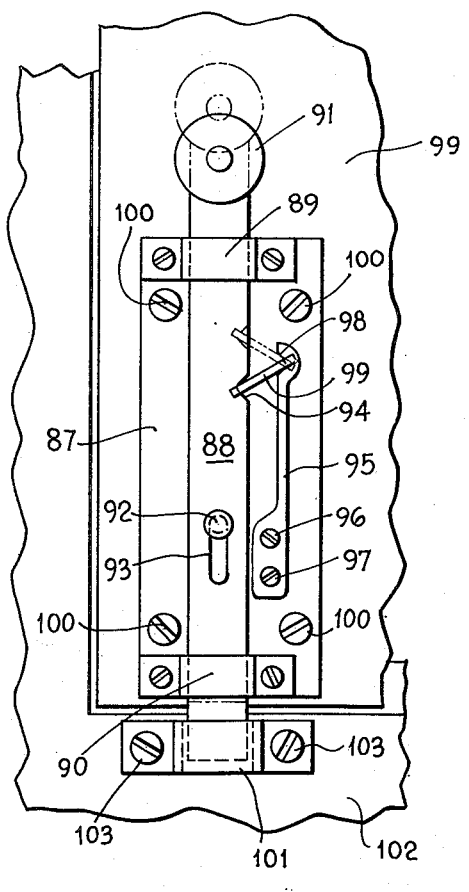
Inventor:
HARLAN N. HARRIS,
By Robert M. McManigal
Attorney.

Patented May 8, 1951

2,551,671

UNITED STATES PATENT OFFICE 2,551,671

OVER-CENTER MECHANISM

Harlan N. Harris, Pasadena, Calif.

Application March 11, 1946, Serial No. 653,669

2 Claims. (Cl. 33—79)

My invention relates to over-center means for controlling the movement and position of a movable member.

An object of my invention is to positively hold a movable member in one or the other of two positions.

Another object of my invention is to hold with considerable force a movable member in one or the other of two positions even when said positions are close together.

Another object of my invention is to provide, in a mechanical device, a means for positively engaging a drive mechanism with, or disengaging said drive mechanism from, a driven mechanism.

In one form of my invention a movable member is mounted on a support, a cantilever spring is mounted on said support and a link is provided between said movable member and said cantilever spring. The movement of the movable member may be rotational, linear, or a combination of rotational and linear. The range of movement, either angular or linear, is limited, and the cantilever spring and connecting link are so arranged that over one part of the range of movement a force component, acting on the movable member and due to the cantilever spring, is in one direction, and over an adjacent part of the range of movement a force component, acting on the movable member and due to the cantilever spring, is in the opposite direction.

As an example of my invention I shall describe an application to a micrometric control means on a drafting machine comprising a fixed member clamped to a drawing board, an arm pivoted at one end to the fixed member, a second arm pivoted at one end to the moving end of the first arm, and a drafting head carried at the free end of the second arm and movable over the drawing board. The drafting head includes a protractor and a protractor arm provided with a vernier or witness point and with means for holding one or more rulers or straight edges which can be rotated about the protractor. As the drafting head is moved over the drawing board, orientation of the protractor is held constant either by some combination of pulleys and bands or by some combination of parallel arms.

The drafting head of the machine is provided with a micrometric protractor arm control; that is to say, the protractor arm is rotatable with respect to the protractor and is adapted to be held firmly in any required azimuth while, at the same time, means are provided whereby the arm can be moved slowly and under firm control through either large or small angles, said means being so constructed as to be readily disengaged to permit rotating the protractor arm quickly through large angles. In one form of drafting machine this is accomplished by a worm and gear mechanism. The gear is mounted on the pulley shaft and is locked to rotate with the pulley. The worm screw is mounted on a subplate, said subplate being mounted on the handle plate which carries the handle by which the protractor arm is rotated. The subplate is pivoted to the handle plate in such a manner that rotation of the subplate about the pivot causes the worm to move toward the gear or away from the gear as desired.

My invention provides a spring and link whereby the worm is pressed firmly against the gear when engaged therewith so as to eliminate lost motion, and whereby the worm is firmly held away from the gear when disengaged in order to reduce the likelihood of accidental engagement.

As further examples of my invention I shall describe applications to a vernier caliper and to a simple bolt type lock.

My invention has many other objects, advantages, and features, some of which, with the foregoing, will be apparent from the forms shown in the following descriptions, and the accompanying drawings, which are now considered to be preferred embodiments of the invention. It should be understood, however, that these particular embodiments of the invention are chosen for the purpose of exemplification, and I do not limit myself to the forms shown, since the invention, as set forth in the claims, may be embodied in a large plurality of forms.

Referring to the drawings:

Figure 3 is a sectional view taken along the lines 3—3 in Figure 2 and showing further some of the details of the micrometric control devices.

Figure 4 is a sectional view taken along the line 4—4 in Figure 2 and showing further some of the details of the machine.

Figure 5 is a plan view showing details of the subplate carrying the worm, and the method by which it is mounted upon the handle plate.

Figure 6 is a plan view of the two jaws and a portion of the beam of a vernier caliper embodying my invention.

Figure 7 is a front elevation of a bolt type lock embodying my invention attached to a swinging window.

Figure 1:
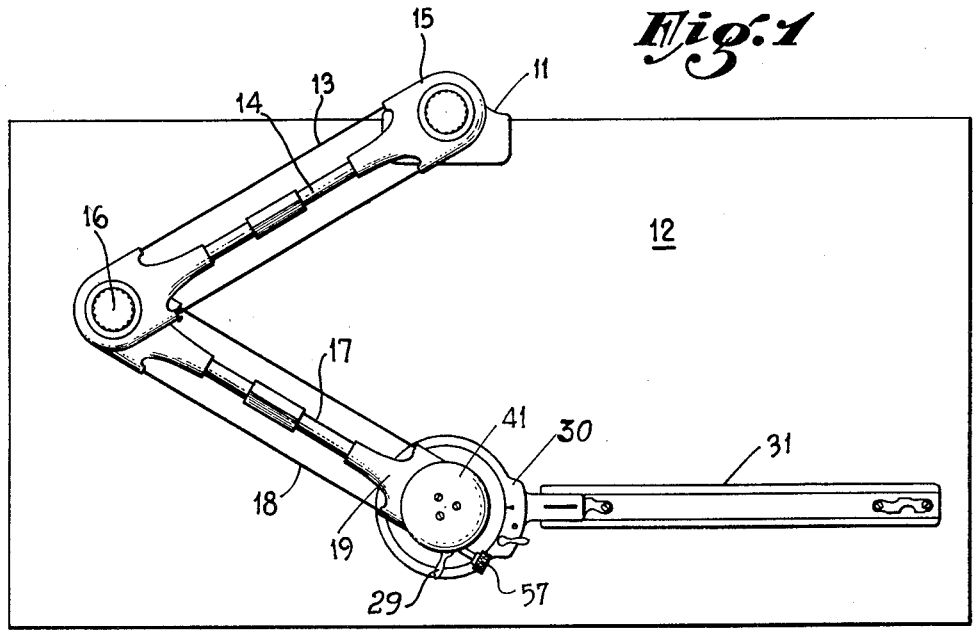
Figure 1 is the plan view of a drafting machine of the pulley and band type embodying my invention.

Referring to the form of my invention shown in Figures 1 to 5, the numeral 11 indicates any conventional clamp for holding the drafting machine to a drawing board 12. The clamp 11 carries a pivot shaft rising perpendicularly to the board, to which is rigidly affixed a single groove pulley (not shown) which is engaged by a band 13. An arm 14 is pivoted to the shaft by a suspension head 15 in such a manner that it can be rotated about said shaft. At the other end of the arm 14 is a two groove pulley (not shown) which is mounted on the axis of articulation at 16 between the arms 14 and 17. The band 13 engages one groove of this pulley and a band 18 engages the other groove.

As shown in Figure 3, the other end of the arm 17 is connected to a pulley housing 19 in which is mounted a hollow shaft 20 by means of ball bearing 21. The hollow shaft 20 is provided with a flange 22 at its lower end and threads at its upper end. Also mounted on said hollow shaft 20 is a lock plate 23 and a pulley 24 which, together with the above-mentioned ball bearing 21, are held in position by means of nut 25. The lock plate 23 and the pulley 24 are adapted to be held together as a unit by means of screws 26. The band 18 engages the pulley 24. A gear 27 is firmly affixed to the upper end of the nut 25. Concentric with the hollow shaft 20 is the protractor 28 which can be engaged to rotate with the shaft 20 by a lock lever device 29 which locks the protractor 28 to the lock plate 23. Details of the lock lever device 29 are shown in Figure 4. From the foregoing it is clear that the gear 27 is fixed to the shaft 20; moreover, the protractor 28 is also fixed to the shaft 20 when the protractor 28 is locked to the lock plate 23.

As clearly shown in the drawings, a protractor arm 30 extends beneath the protractor 28 and a part of said protractor arm encircles the protractor, serving as a guard and bearing a witness point to indicate the angular position of the protractor arm relative to the protractor. Mounted upon the protractor arm 30 is the scale 31.

The protractor arm 30 is adapted to be rotated with respect to the protractor 28. As an instance of this arrangement, disposed in the hollow shaft 20 is a smaller shaft 32, at the lower end of which are a flange 33 and a cross pin 34. The protractor arm 30 is designed to rotate with the shaft 32 by being pressed firmly down against the flange 33 in such a manner that the cross pin 34 is pressed into a slot 35 in the protractor arm. The upper end of the shaft 32 is threaded and a nut 36, screwed lightly down against the upper end of the hollow shaft 20, holds the protractor arm 30 up against the protractor 28, but permits said protractor arm 30 to be rotated with respect to said protractor 28 and the lock plate 23 to which said protractor may be locked.

Above the nut 36 is the handle plate 37 having a slot 38 similar to the slot 35 in the base plate, said slot 38 being provided to receive a cross pin 39 through the shaft 32. A nut 40 acts as a lock to hold the nut 36 and the handle plate 37 firmly upon the shaft 32. A handle 41 is fastened to the upper side of the handle plate 37 by means of screws 42, by means of which the protractor arm 30 is adapted to be rotated.

Figure 2:
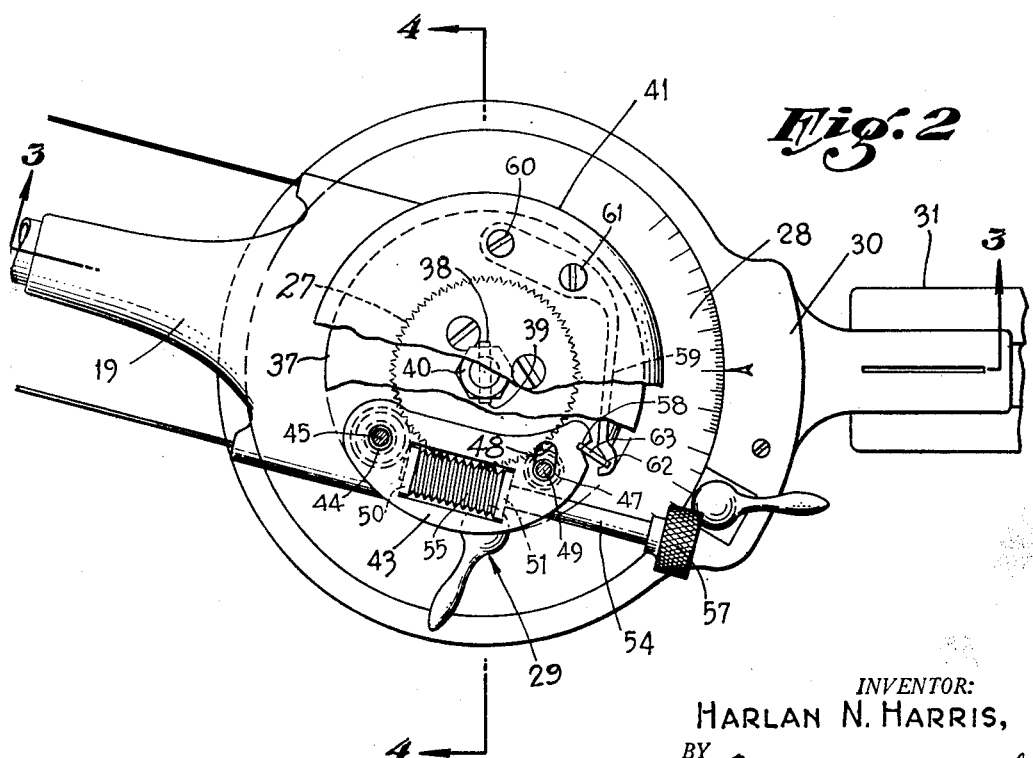
Figure 2 is a plan view of the drafting head of the machine showing certain details of construction.

Micrometric control means is provided whereby the protractor arm 30 can be moved slowly and under firm control with respect to the protractor 28 through either large or small angles, together with means for readily engaging or disengaging the micrometric control means so that the protractor arm 30 can be rotated under micrometric control or freely rotated as may be desired. As an instance of this arrangement, as shown in Figures 2 and 3 and in somewhat greater detail in Figure 5, a subplate 43 is fastened to the under side of the handle plate 37. This subplate is designed to rotate through a small arc about a flanged bushing 44, which is held firmly against the handle plate 37 by means of the screw 45. A spring washer 46 between the flange of the bushing 44 and the subplate 43 holds the latter against the handle plate 37 and eliminates vertical play. A flanged stop bushing 47 passes through a slot 48 in the subplate 43 and is held firmly against the handle plate 37 by means of the stop bushing screw 49. The purpose of this arrangement is to limit the arc through which the subplate 43 can be rotated about the bushing 44; moreover, the flange of the bushing 47 tends to hold the subplate 43 close to the handle plate 37.

Depending from the subplate 43 are two lugs 50 and 51 provided with holes 52 and 53, through which passes a shaft 54 upon which is fixed a worm 55 between the lugs 50 and 51. A spring washer 56 on the shaft 54, and interposed between one end of the worm 55 and the lug 50, is provided to eliminate end play of the worm between the lugs. To the outer end of the shaft 54 is fixed a knurled thumbpiece 57, by means of which the shaft 54 and the worm 55 can be rotated. The thumbpiece 57 can also be used to rotate the subplate 43 through its small arc about the bushing 44; that is to say, it can be used to engage and disengage the worm 55 and the gear 27. One limit of the arc, as determined by the slot 48, is such that the worm 55 will clear the gear 27 when the subplate is pressed as far as possible outward and away from the center of the handle plate 37. The other limit of the arc, as determined by the slot 48, permits the worm 55 to engage firmly the gear 27 when the subplate is moved as far as possible toward the center of the handle plate 37; indeed, the slot permits slightly greater motion than the gear permits, so that firm engagement is insured even after some wear has developed between the worm 55 and the gear 27.

A notch 58 is provided at the end of the subplate 43 remote from bushing 44. A cantilever spring 59 is provided to hold the subplate 43 in one or the other of its extreme positions. One end of the spring 59 is fastened to the handle plate 37 by means of the screws 60 and 61. The active limb of the cantilever spring 59 is provided with a notch 62, similar to the notch 58 in the subplate 43, on a line substantially perpendicular to the path of the notch 58, as the subplate moves through its restricted arc, and lying between the extreme positions of the notch 58 as the subplate 43 is moved through its limited arc about the bushing 44. A short link 63, with a notch at either end, is interposed between the subplate 43 and the active limb of the cantilever spring 59, the notch at one end of said link engaging the notch 58 in the subplate and the notch at the other end engaging the notch 62 in the spring. It should be particularly noted that on either side of a line through the pivotal point provided by the notch 62 on the active limb of the spring 59 and substantially perpendicular to the path of movement of the notch 58, the force components of the spring 59, transmitted by the link 63 along the path of the bottom of the notch 58, are in opposite directions. It is clear that this arrangement provides an over-center mechanism whereby on one side of the center the subplate 43 is pressed toward one limit of its restricted arc and on the other side of the center said subplate is pressed toward the other limit of the arc; that is to say, it provides means for pressing the worm in engagement with the gear 27 on the one hand, and for holding it clear of the gear 27 on the other hand.

Referring now to the form of my invention shown in Figure 6, the numeral 64 indicates the beam of a vernier caliper with graduations 65 along one edge. Along the other edge is cut a rack 66 having inclined teeth. To one end of the beam 64 is attached the fixed jaw 67. A sliding jaw 68 is provided with members 69 and 70 which hold it slidably upon the beam 64. A vernier 71 on the sliding jaw 68 is provided to permit accurate readings of the graduations 65. Upon the sliding jaw 68 is mounted a gear 72 provided with helical teeth which engage the inclined teeth of the rack 66. The gear 72 is controlled by a worm screw mechanism whose operation is very similar to that of the worm screw mechanism shown in Figures 1 to 5 and which, therefore, will not be described in detail. A subplate 73 is fastened to the sliding jaw 68. This subplate is designed to rotate through a small arc about the pivotal point 74, the arc of rotation being limited by a slot and screw at 75. Attached to the subplate 73 are two lugs 76 and 77 through which passes a shaft 78 upon which is fixed the worm 79. To the outer end of the shaft 78 is fixed a knurled thumbpiece 80 by means of which the shaft 78 and the worm 79 can be rotated. The thumbpiece 80 can also be used to rotate the subplate 73 through its small arc about the pivotal point 74; that is to say, it can be used to engage and disengage the worm 79 and the gear 72. A notch 81 is provided at the end of the subplate 73 remote from the pivotal point 74. A cantilever spring 82 is provided to hold the subplate 73 in one or the other of its extreme positions. One end of the spring 82 is fastened to the sliding jaw 68 by means of the screws 83 and 84. The active limb of the spring 82 is provided with a notch 85, similar to the notch 81 in the subplate 73, directly opposite the mid-position of the notch 81 as the subplate is moved through its restricted arc. A short link 86, with a notch at either end, is interposed between the subplate 73 and the active limb of the spring 82, the notch at one end of said link engaging the notch 81 in the subplate and the notch at the other end engaging the notch 85 in the spring. It is clear that this arrangement provides an over-center mechanism whereby on one side of the center the worm 79 is pressed into engagement with the gear 72 and on the other side of the center said worm is pressed away from the gear 72. In operating this device, the worm 79 is pressed away from the gear 72 by means of the thumbpiece 80, thereby permitting the gear 72 to roll freely along the rack 66 while the sliding jaw 68 is set to approximately the required position. The worm 79 is then pressed into engagement with the gear 72 by means of the thumbpiece 80. Final accurate setting is made by turning the thumbpiece 80 and thereby the worm 79 which rotates the gear 72 and moves the jaw 68 under firm control along the beam 64.

In the foregoing examples we have shown the movable members 43 and 73 as moving through arcs, but it is obvious that the link and spring device can be applied equally well to a simple sliding member or to a member whose movement combines sliding and rotating. Let us now consider an application of my invention to a simple sliding member.

Referring to Figure 7, the numeral 87 indicates the supporting plate of a simple bolt-type lock such as may be used on a door or swinging window. A bolt 88 is slidably held against the plate 87 by the members 89 and 90. A knob 91 is provided to afford a handle for sliding the bolt 88. The movement of the bolt 88 is restricted by the pin 92 passing through the slot 93 in the bolt 88, fixed to the plate 87. A notch 94 is provided on one side of the bolt 88. A cantilever spring 95 is provided to hold the bolt 88 in one or the other of its extreme positions. One end of the spring 95 is fastened to the support plate 87 by means of the screws 96 and 97. The active limb of the spring 95 is provided with a notch 98. The cantilever spring 95 is so positioned that the notch 98 lies opposite the position midway between the two extreme positions of the notch 94 as the bolt 88 is moved back and forth through its restricted range. A short link 99, with a notch at either end, is interposed between the bolt 88 and the active limb of the spring 95, the notches at the ends of said link engaging the notches 94 in the bolt and 98 in the spring respectively. The support plate 87 carrying the bolt lock mechanism is fastened to the edge of the window 99 by means of screws 100. A bolt strike 101 is fastened to the window frame 102 by means of screws 103. The bolt strike 101 is so positioned opposite the bolt 88 that said bolt 88, when in its extreme lower position, will engage said bolt strike and that said bolt 88, when in its extreme upper position, will be clear of said bolt strike. Obviously, when the bolt 88 engages the bolt strike 101 the window 99 is held in juxtaposition with the window frame 102; also, when the bolt 88 is clear of the bolt strike 101 the window 99 can be swung open. In the foregoing structure it is clear that the cantilever spring 95 and the link 99 hold the bolt 88 in either one of its extreme positions; that is to say, the spring and link mechanism holds the bolt in the locked or unlocked position, as may be required. In the illustration the bolt 88 is shown as sliding vertically, the locked position being the extreme lower position of the bolt; but it is obvious that the bolt can be fastened to a door or a window so as to operate in any position either horizontally, vertically upward, or in some diagonal position.

An important feature of my invention is that a movable member can be held with considerable force in one or the other of two positions even when the movement of the movable member is very small. This is accomplished by using a strong spring and by using a very short link between the spring and the movable member.

Much of the advantage of my invention flows from the fact that the spring not only serves as such, but is so formed as to provide a pivot attached to the fixed member to engage a link operative between the fixed member and the movable member.

From the foregoing descriptions, taken in connection with the accompanying drawings, the uses, advantages and operations of my invention will be readily understood by those skilled in the various arts in which the invention may be employed. While I have described the principle and operation of my invention, together with three applications to practical arts, I desire to have it understood that the forms shown are merely illustrative and that the invention is not to be limited to the details disclosed herein, but is to be accorded the full scope of the appended claims.

I claim:

1. In the drafting head of a drafting machine of the band and pulley type; a pulley; a gear above said pulley and mounted on a shaft concentric therewith and affixed thereto; a supporting member carried by a second shaft concentric with said first shaft and with said pulley; a movable member mounted on said supporting member; means for limiting the movement of said movable member with respect to said supporting member; a spring mounted upon said supporting member, said spring having an active limb; a link operating between said movable member and the active limb of said spring, said link being pivoted to said movable member and to said active limb of said spring; means for so restricting the movement of said movable member that the extreme positions of the pivotal point on said movable member lie on opposite sides of a line through the pivotal point on said active limb of said spring and substantially perpendicular to a line through said extreme positions of the pivotal point on said active member; a worm screw mounted upon said movable member, said worm screw being adapted to engage said gear when said movable member is moved to one position and said worm screw being adapted to be clear of said gear when said movable member is moved to another position.

2. In a drafting head of a drafting machine of the band and pulley type, the combination of: a pulley; a gear secured to said pulley for rotation therewith and in concentric relation thereto; a supporting member concentric with said gear and pulley and rotatable relative thereto; a movable member mounted for pivotal movement on said supporting member; manual means for pivotally moving said movable member; a worm screw rotatably mounted on said movable member, said movable member being pivotally movable from a first position in which said worm screw is in meshing engagement with said gear to a second position in which said worm screw is free from engagement with said gear; a cantilever spring having one only of its ends secured to said supporting member and having its free end positioned adjacent said movable member, said spring forming approximately a right angle with a line extending from the free end of said spring through the pivot point of said movable member; and a rigid link positioned between said movable member and the free end of said spring, said link lying on one side of the above mentioned line and forming an acute angle therewith when said movable member is in said first position and said link is transmitting force from said spring to maintain said worm screw and gear in meshing engagement, and said link lying on the opposite side of such line and forming an acute angle therewith when said movable member is in said second position and said link is transmitting force from said spring to maintain said movable member in said second position.

HARLAN N. HARRIS.

REFERENCES CITED

The following references are of record in the file of this patent:

UNITED STATES PATENTS

| Number | Name | Date |
|---|---|---|
| 279,534 | Byrne | June 19, 1883 |
| 687,032 | Karrenberg | Nov. 19, 1901 |
| 965,483 | Noyes | July 26, 1910 |
| 1,074,851 | Ewbank | Oct. 7, 1913 |
| 1,459,792 | Nilant | June 26, 1923 |
| 1,728,834 | Langley | Sept. 17, 1929 |
| 1,813,801 | Haynes | July 7, 1931 |
| 2,085,300 | Dillman | June 28, 1937 |
| 2,168,940 | Little | Aug. 8, 1939 |
| 2,217,008 | Garner | Oct. 8, 1940 |
| 2,226,882 | Wallace | Dec. 31, 1940 |
| 2,296,875 | Ritchie | Sept. 29, 1942 |
| 2,313,341 | Holmes | Mar. 9, 1943 |